United States Patent [19]
Hunter

[11] 3,810,080
[45] May 7, 1974

[54] SWIMMER-DIVE NAVIGATION AND RECONNAISSANCE DEVICE

[75] Inventor: Earl K. Hunter, Gig Harbor, Wash.

[73] Assignee: The United States of America as represented by the Secretary of the Navy, Washington, D.C.

[22] Filed: Oct. 13, 1972

[21] Appl. No.: 297,577

[52] U.S. Cl. .............................. 340/3 R, 340/3 D
[51] Int. Cl. ........................... G01s 9/66, G01s 7/52
[58] Field of Search ........... 340/3 R, 3 D, 5 R, 3 C; 114/16 A; 73/178 R, 181

[56] References Cited
UNITED STATES PATENTS

| | | | |
|---|---|---|---|
| 3,045,206 | 7/1962 | Ahrens et al. | 340/3 R |
| 3,584,594 | 6/1971 | Poutout | 115/6.1 |
| 3,437,987 | 4/1969 | Burg | 340/3 D |

Primary Examiner—Richard A. Farley
Attorney, Agent, or Firm—Richard S. Sciascia; Don D. Doty; Harvey A. David

[57] ABSTRACT

A navigation/reconnaissance device is disclosed which comprises a hand-held pressure hull having a viewing port through which a using swimmer-diver views a drift meter for correcting his compass heading to compensate for water currents, a depth meter, a distance meter, and a strip chart recorder showing total water depth and distance traveled vs. time. The hull houses or carries all components for doppler sonar, swimmer-diver depth meter, altimeter, and combinations of the outputs thereof.

10 Claims, 4 Drawing Figures

PATENTED MAY 7 1974 3,810,080

SWIMMER-DIVE NAVIGATION AND RECONNAISSANCE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to navigation and reconnaissance devices and more particularly to apparatus for providing improved underwater navigation and reconnaissance capability to swimmer-divers.

Swimmer-diver navigation has previously been conducted utilizing very coarse methods of dead reckoning. These have included a liquid filled compass to maintain heading, a wrist watch to measure time, and sometimes counting swimming kicks to measure distance. Additionally, hydrostatic depth gauges have been used to reveal swimmer-diver depth below the surface, and lead lines to reveal the altitude of the swimmer-diver over the bottom. On reconnaissance missions, data such as courses, estimated distances, diver and bottom depths, have been recorded on a slate, but this is, of course, a technique which tends to limit the frequency of data samples and hinders the swimmer-diver's progress. Moreover, the prior techniques are completely lacking in ability to detect and compensate for drift due to ocean currents, except in those few circumstances where a swimmer-diver can visually watch the bottom and discern the fact that cross currents are causing him to travel a course over the bottom which is at variance to his heading. Even in those circumstances only a gross estimate of such current effects can be made and utilized for heading correction.

In recent years various forms of ship navigation systems have been developed utilizing doppler effects of sonar and which are capable of providing accurate data as to direction and speed of travel over the ocean bottom, thereby avoiding prior problems of estimating set and drift due to currents and winds. One such system, which shares some features with the present invention, is that described in U.S. Pat. No. 3,437,987 to K. E. Burg and entitled "Underwater Navigation Method and System." In that system a submerged vessel is towed by a ship, the vessel carrying doppler sonar hydrophones, and a hydrophone for determining the distance (altitude) between the towed vessel and the underwater bottom surface. Distance from the vessel to the upper water surface is determined by calibration of the tow cable winch. The outputs of the instrumentations on the towed vessel are fed by cable to the towing ship for use in navigation thereof, particularly in deep water where hull mounted doppler systems lose their reliability because of scattering and the like.

SUMMARY OF THE INVENTION

Now with the foregoing in mind, it is a principal object of this invention to provide an improved swimmer-diver navigational and reconnaissance device which will enable the user to accurately follow given course, depth, and distance instructions in carrying out a mission.

Another object of this invention is the provision of a novel, wholly self-contained, swimmer-diver carried navigational and reconnaissance aid which includes not only a conveniently read compass, but also a drift meter in combination with the compass, which drift meter automatically provides a direct indication to the swimmer-diver of the amount and direction of heading correction necessary to be made by him in order to make good a particular course.

Still another object of the invention is the provision of an improved swimmer diver navigational and reconnaissance device of the foregoing character and including a distance meter which accurately and automatically indicates distance traveled over the bottom, and can be readily reset by the user if desired.

Yet another object of the invention is the inclusion of a direct reading depth indicator which provides an instantaneous reading of the distance from the water surface of the diver.

A further, and important, object of the navigational and reconnaissance device of this invention is to provide a permanent, and visible to the swimmer-diver, record or chart of the total depth of water. To this end the invention includes automatic means for detecting the altitude of the swimmer-diver over the bottom, adding the altitude to the swimmer-diver depth, and recording the results as a function of time.

As another object, the invention contemplates the recording on the aforementioned record or chart the passage of predetermined increments of distance traveled and, at the option of the user, event marks for indicating say the locations of objects, change of course, or the like.

As still another object the invention aims to provide a navigational device combining any or all of the foregoing features in a unique hull construction which is readily propelled and steered by a swimmer-diver, and which has all controls and displays arranged for operational use and view by an operator without materially detracting from his ability to travel and to observe as is necessary to his mission.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figures 1, 2, 3:
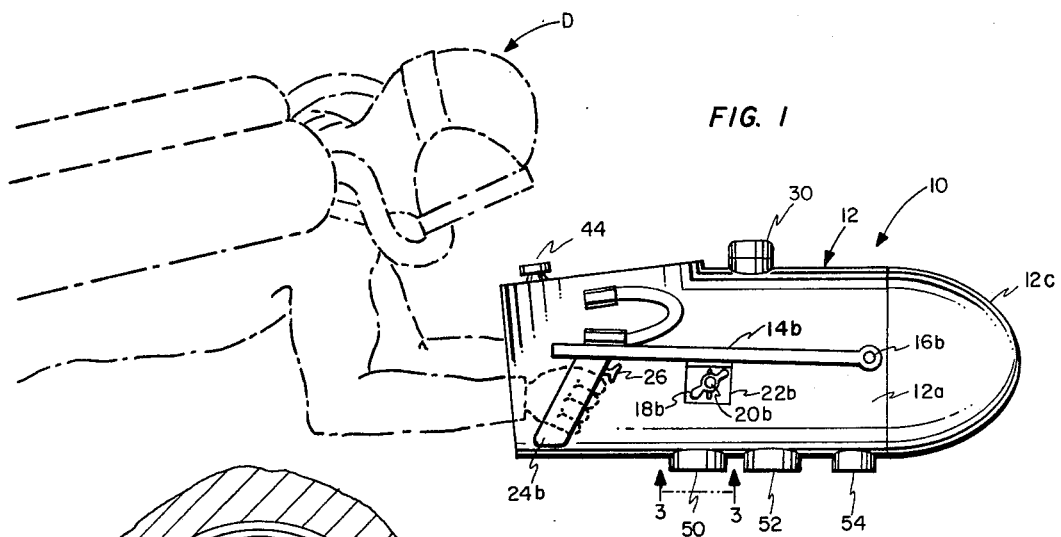
FIG. 1 is a side elevational view of a navigational and reconnaissance device embodying the present invention, with a phantom showing of swimmer-diver using the device.
FIG. 2 is a plan view of the device of FIG. 1 on an enlarged scale.
FIG. 3 is an enlarged bottom view of a transducer array of the device of FIG. 1 taken substantially along line 3—3 thereof.

In the form of the invention illustrated in the drawing and described hereinafter, with particular reference first to FIG. 1, there is provided a swimmer-navigation and reconnaissance device, generally indicated at 10, and shown in a typical attitude of use as it is held and steered by a swimmer-diver D. The device 10 comprises a pressure hull 12 which is conveniently constructed of a first cylindrical section 12a and a second, shorter cylindrical section 12b, welded together at an angle slightly more than 90°. A streamlined nose element or section 12b renders the device 10 hydrodynamically satisfactory for the diver D to push through the water with little effort. The nose section 12c is preferably removable to provide access to the interior of the device, and may be provided with flotation material and/or ballast material as is necessary to give the device a substantially neutral buoyancy and the desired trim for ease in use.

Adjustably mounted on opposite sides of the pressure hull 12 are a pair of wings or planes 14a and 14b, best illustrated in FIG. 2. The wings 14a and 14b have their leading ends pivoted on trunions 16a and 16b, respectively, extending from the hull section 12a. The wings are secured in selected positions by wing nuts 18a and 18b on studs 20a and 20b which extend from the hull 12 through slots in angle brackets 22a and 22b depending from the wings.

A pair of hand grips 24a and 24b extend downwardly from the rearward portion of the wings 14a and 14b, respectively. These hand grips are conveniently provided with finger actuated switches, in the nature of triggers, one of which is shown at 26 in FIG. 1. The purpose of these switches will be made apparent as the description proceeds. Adjustment of the wings 14a and 14b, within the limits permitted by the brackets 22a and 22b, allows a particular diver to select a trim position of wings which will best maintain the hull 12 level in use. It will be appreciated that when a swimmer-diver D propels himself with his swim fins while holding the device by the hand grips 24a and 24b he can effectively steer the device in front of him while keeping it level to avoid distortion of distance, depth, and altitude measurements. A bubble level may be advantageously provided for monitoring by the user.

Mounted on the top of the hull section 12a in a position convenient for easy viewing is a liquid filled magnetic compass 30 which is, of itself, of conventional construction. The compass 30, which is mounted with its lubber's line 30a on or parallel to the centerline of the device 10, is conveniently illuminated by an electric light energized by batteries internally of hull 12 and under the control of one of the finger switches on the hand grips 24a or 24b.

As is best seen in FIG. 2, the hull section 12d terminates in a circular viewing port which is sealed by a transparent window 34. Mounted within the hull section 12b for viewing through the port window 34 are a plurality of indicating instruments including a strip chart recorder 36 for recording total water depth, a drift indicating meter 38 for indicating deviation from a desired heading due to ocean currents, a depth indicating meter 40 for indicating the depth of the swimmer-diver below the water surface, and a distance traveled indicating meter 42 which conveniently shows the total distance traveled by the swimmer-diver in increments such as yards. The last mentioned indicating meter is conveniently in the form of a counter which can be manually reset by the swimmer-diver as necessary to determine distances run along different courses. Resetting of the distance traveled meter 42 is accomplished by rotation of a knob 44 to swing an arm 44a into actuating engagement with a reset lever 46. The knob 44 also controls the on or off condition of the strip chart recorder 36, the recorder being in an on condition when the knob 44 is positioned with the arm 44a in its full line position, and is in its off condition when the knob is positioned with the arm in the dotted line position. The purposes, functions, and manner of operation of these various instruments will later be described in more detail.

Reverting now to FIG. 1, the hull 12 is provided along its lower limb with a plurality of transducer arrays. Thus, there is provided a doppler sonar transmitting transducer array 50, a doppler sonar receiving transducer array 52, and an altimeter transmitting and receiving transducer 54. Referring to FIG. 3, the transmitting transducer array 50 comprises four transducer elements which face generally downwardly but are canted so as to project their beams at angles 30° from the vertical when the device 10 is horizontally oriented. Thus, the transducer element 50a looks somewhat to the rear and is known as the aft transmitting transducer, the transducer element 50b is known as the fore transducer element, while elements 50c and 50d constitute port and starboard transducer elements.

Figure 4:
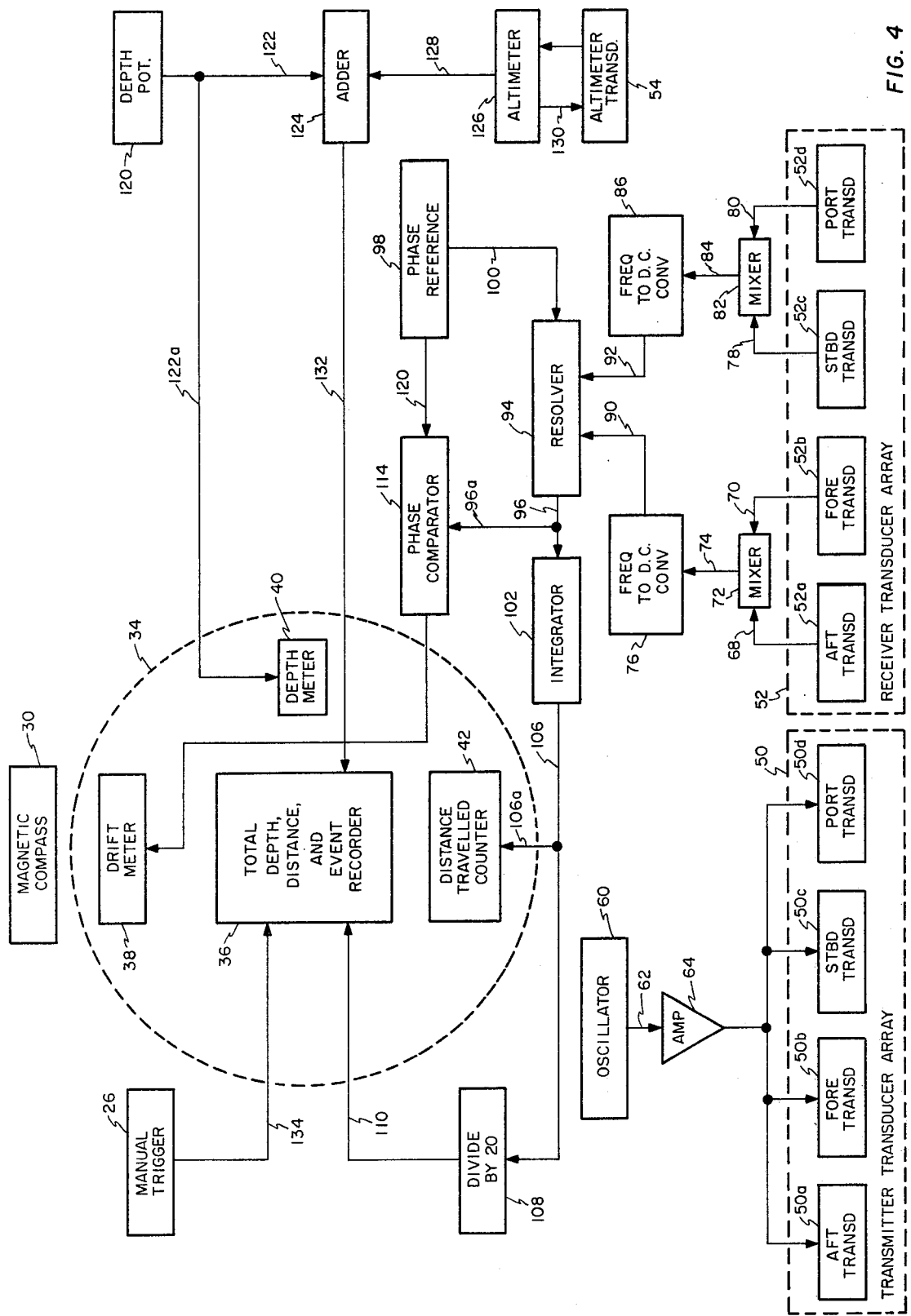
FIG. 4 is a diagrammatical view, in block form, of the various operational components of the device of FIG. 1.

The doppler sonar receiving transducer array 52 is similarly constituted and includes an aft transducer element 52a, a fore transducer element 52b, a starboard transducer element 52c, and a port transducer element 52d (FIG. 4). The altimeter transducer 54 constitutes a single downwardly directed element.

The input for the drift meter 38 is derived from a doppler sonar system of which the transducer arrays 50 and 52 form a part. Referring particularly now to FIG. 4, the transmitting portion of the doppler sonar comprises a suitable oscillator 60, the output of which is applied as shown by line 62 to a power amplifier 64 which drives the transmitter transducers 50a . . . 50d. Bottom return echoes picked up by the aft and fore transducers 52a, 52b are converted thereby to electrical signals which are applied as shown by lines 68, 70 to a mixer 72. The output of the mixer 72, represented by line 74, constitutes a frequency which is characterized by any doppler effect resulting from opening or closing of distances between the swimmer-diver and various bottom irregularities resulting from components of motion of the device 10 along its fore and aft axis. The output of the mixer 72 is fed to a frequency to d.c. voltage converter 76 which produces a d.c. voltage output level corresponding to such motion along the fore and aft axis.

Similarly, the starboard and port receiver transducers 52c, 52d have their outputs connected as shown by lines 78 and 80 to a mixer 82. The output of the mixer 82 is connected by a line 84 to a frequency to d.c. converter 86, the output of which is a d.c. level which varies in accordance with components of motion of the device 10 transverse to its fore and aft axis. The outputs of the frequency to d.c. converters 76 and 78 are connected as shown by lines 90 and 92 to a resolver 94. The resolver 94 serves to combine the outputs of the converters 76 and 78 to produce a resultant signal on line 96 which is representative of motion of the device 10 over the ocean bottom. While other forms of resolver may be used, the resolver 94 produces an output signal at 96 whose magnitude is proportional to total velocity and whose phase with respect to the reference 98 is indicative of the drift angle of the device 10.

The output of the resolver 94 is applied by the line 96 to an integrator 102 which produces on line 106 a series of pulses, each of which is representative of travel over a predetermined increment of distance which in a working embodiment of the device was selected as one yard. The integrator output is fed by lines 106 and 106a to the distance traveled counter 42 for direct viewing through the port window 34. The integrator output is further applied to a divide-by-twenty divider 108, the output of which is applied to the recorder 36 by a line 110. The recorder 36 is responsive to the output of the divider 108 to produce a distinguishing mark 112 representative of every 20 yards of travel on the chart thereof.

The output of the resolver 94 is further applied by a line 96a to a phase comparator 114 which produces on line 116 a signal proportional to the drift angle of the device 10, the phase comparator utilizing an output 120 of the phase reference source 98 as a reference. The output of the phase comparator 114 is utilized to drive the indicating pointer of the drift meter 38 to a position to one side or the other of its zero or null position so as to indicate to the swimmer-diver the amount of compass correction to utilize in order to make good a desired course. It will be noted in this regard that the drift meter 38 is physically located on the center line of the hull 12, with the zero or null indication of the meter in alignment with the lubber's line of the compass 30. Inasmuch as the output of the phase comparator 114 is related to the drift angle both in amplitude and direction, the indicator of the meter 38 provides the user with a direct reference in relation to the compass, thereby eliminating need for estimating heading corrections.

The recorder 36, in addition to recording yards traveled, records total depth of the water at the swimmer-diver's nadir. To this end, a depth sensing potentiometer 120 is mounted at any convenient location within the hull 12. The depth potentiometer may be any of several conventional constructions, but usually comprises a diaphragm actuated potentiometer wherein one side of the diaphragm is acted upon by hydrostatic pressure and the output of the potentiometer is in the form of a voltage which is proportional to depth.

In this utilization, and in accordance with the invention, the output of the depth potentiometer 120 is applied as shown by line 122 as a first input to a voltage adder 124. The second input to the adder 124 is derived from an altimeter 126 as shown by line 128. The altimeter 126 is connected by a line 130 to the altimeter transducer 54 which projects a sound pulse downwardly toward the bottom. A return echo is sensed by the altimeter transducer 54 and converted to a signal applied by a line 132 to the altimeter. The altimeter 126 comprises circuitry, well known in the art to which the invention pertains, which produces a voltage output on line 128 which is proportional to the distance from the altimeter transducer 54 to the ocean bottom.

The instantaneous output of the adder 124 therefore comprises a voltage signal which is directly proportional to the total water depth from the water's surface to the nadir of the swimmer-diver. This output is applied as shown by line 132 to the tracing element positioning means of the recorder 36, causing it to generate a continuous bottom profile trace 134 on the recorder chart.

The output of the depth potentiometer 120 is further applied, as shown by line 122a to the depth indicating meter 40. The meter 40 is conveniently calibrated in suitable increments such as feet of depth.

One manual trigger 26 is conveniently connected as shown by line 134 to the recorder 36 and, when depressed, serves to place a distinctive mark on the chart of the recorder to provide a reference to some noteworthy event, such as sighting of an object by the swimmer-diver, change of course, or the like. The other manually operated trigger switch advantageously controls lights 138 for illuminating the various indicators as well as the light for compass 30.

From the foregoing detailed description of a navigational and reconnaissance device embodying the invention it will be appreciated that the previously stated objects and advantages, as well as others, have been achieved by the invention.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A swimmer-diver navigation device comprising:
    pressure hull means for housing components against water intrusion when said device is submerged for use by a swimmer-diver;
    a plurality of instrument means, carried by said hull, for sensing a plurality of conditions corresponding to positions and movements of said device in the hands of said swimmer-diver;
    recording means and indicating means carried by said hull means for providing to said swimmer-diver information derived from said conditions sensed by said instrument means;
    said hull means comprising a hull section, a streamlining nose section extending from one end of said hull section, stabilizing plane means extending laterally from opposite sides of said section, and viewing port means for viewing of said recording means and said indicating means, said viewing port means being located at the end portion of said hull section remote from said nose section;
    a compass carried by said hull means;
    said plurality of instrument means comprising doppler sonar means for generating as an output an electrical signal having a first characteristic which is proportional to speed of the device with respect to the bottom surface of a body of water in which used, and having a second characteristic which varies in direction and magnitude with drift of said device with respect to said bottom surface; and
    said indicating means comprising at least a drift indicating means responsive to said electrical signal to indicate the direction and amount of drift correction necessary to make good a predetermined compass course.

2. A device as defined in claim 1, and wherein said plurality of instrument means further comprises:
    depth sensing means for generating an output signal having a characteristic which is proportional to depth of said device below the upper surface of said body of water;

altitude sensing means for generating an output signal having a characteristic which varies in accordance with the distance from said device to its nadir on said bottom surface;

adder means is connected for response to the output signals of said depth sensing means and said altitude sensing means to provide an output signal having a characteristic which varies as the total water depth; and said recorder means is responsive to the output signal of said adder means to generate a permanent record of said total water depth.

3. A device as defined in claim 1, and wherein:

said compass is mounted with its lubber's line parallel to the longitudinal axis of said hull means;

said drift meter means comprises a meter having a pointer element which is deflectable to right and to left of a normal rest position; and said drift meter means is mounted in close proximity to said compass with said rest position aligned with said lubber's line, whereby said swimmer-diver can read said compass and said drift meter substantially simultaneously.

4. A device as defined in claim 1, and wherein:

said indicator means further comprises a distance traveled meter; and said device further being characterized by means coupling said doppler sonar means to said distance traveled meter whereby said distance traveled meter indicates incremental distances traveled in accordance with said first characteristic of said doppler sonar means output signal.

5. A device as defined in claim 1, and wherein:

said recorder means comprises means for generating a permanent record characterized by a mark for each of a predetermined number of said incremental distances traveled.

6. A device as defined in claim 1, and wherein said instrumentation means comprises:

depth sensing means for generating an output signal having a characteristic which is proportional to depth of said device below the upper surface of said body of water;

altitude sensing means for generating an output signal having a characteristic which varies in accordance with the distance from said device to its nadir on said bottom surface;

adder means responsive to said output signals of said depth sensing means and said altitude sensing means to provide an output signal having a characteristic which varies as the total water depth; and said recorder means is responsive to the output signal of said adder means to generate a permanent record of said total water depth.

7. A device as defined in claim 6, and wherein:

said compass is mounted with its lubber's line parallel to the longitudinal axis of said hull means;

said drift meter means comprises a meter having a pointer element which is deflectable to right and to left of a normal rest position; and said drift meter means is mounted in close proximity to said compass with said rest position aligned with said lubber's line, whereby said swimmer-diver can read said compass and said drift meter substantially simultaneously.

8. A device as defined in claim 7, and wherein:

said indicator means further comprises a distance traveled meter; and said device further being characterized by means coupling said doppler sonar means to said distance traveled meter whereby said distance traveled meter indicates incremental distances traveled in accordance with said first characteristic of said doppler sonar means output signal.

9. A device as defined in claim 8, and wherein:

said recorder means comprises means for generating a permanent record characterized by a mark for each of a predetermined number of said incremental distances traveled.

10. A swimmer-diver navigation device for indicating and recording various parameters concerning a body of water and the progress, course, and depth of a user when the device is caused to accompany the user, said device comprising:

pressure hull means for housing components against water intrusion when said device is submerged for use by a swimmer-diver;

said hull means comprising a first cylindrical hull section, a streamlined nose section extending from one end of said first hull section, a second cylindrical hull section having one end connected to the other end of said first hull section at an angle of slightly more than 90° thereto, the other end of said second hull section defining a viewing port;

stabilizing plane means extending laterally from opposite sides of said first hull section, said plane means being pivoted to said hull means for movement about a transverse axis with respect to said hull means;

means for adjustably securing said plane means in selected positions;

pressure sensing potentiometer means for providing a first electrical signal representative of depth of said device below the surface of a body of water in which it is submerged;

altimeter means for providing a second electrical signal representative of the altitude of said device over its nadir on the bottom surface of said body of water;

adder means responsive to said first and second electrical signals to provide a third electrical signal representative of total water depth;

recorder means responsive to said third signal to produce a record of total water depth;

compass means carried by said hull means;

doppler sonar means for generating a fourth electrical signal having a first characteristic which is representative of distance covered by said device over the bottom and having a second characteristic which is representative of drift with respect to said bottom;

drift meter means mounted adjacent to said compass means and responsive to said second characteristic of said fourth electrical signal to indicate direction and degree of drift;

integrator means responsive to said first characteristic of said fourth electrical signal to provide a series of output pulses each representing predetermined increment of distance traveled;

said recording means being responsive to said output pulses to produce a record thereof in relation to said total depth record; and means including resettable counter means for providing a direct numerical representation of distances traveled.

* * * * *